(12) United States Patent
Tamura et al.

(10) Patent No.: US 10,648,381 B2
(45) Date of Patent: May 12, 2020

(54) PARTICULATE MATTER DETECTING DEVICE

(71) Applicant: DENSO CORPORATION, Kariya, Aichi-pref. (JP)

(72) Inventors: Masayuki Tamura, Kariya (JP); Takashi Araki, Kariya (JP); Masahiro Yamamoto, Kariya (JP); Go Miyagawa, Kariya (JP); Manabu Yoshidome, Kariya (JP); Masato Katsuno, Kariya (JP); Toshihiro Sakawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 36 days.

(21) Appl. No.: 15/769,794

(22) PCT Filed: Oct. 21, 2016

(86) PCT No.: PCT/JP2016/081241
§ 371 (c)(1),
(2) Date: Apr. 20, 2018

(87) PCT Pub. No.: WO2017/069232
PCT Pub. Date: Apr. 27, 2017

(65) Prior Publication Data
US 2018/0313243 A1    Nov. 1, 2018

(30) Foreign Application Priority Data

Oct. 21, 2016 (JP) .................................. 2015-207174

(51) Int. Cl.
*F01N 3/023* (2006.01)
*G01N 27/04* (2006.01)
(Continued)

(52) U.S. Cl.
CPC ............... *F01N 3/023* (2013.01); *F01N 3/00* (2013.01); *F02D 41/1494* (2013.01);
(Continued)

(58) Field of Classification Search
CPC combination set(s) only.
See application file for complete search history.

(56) References Cited

U.S. PATENT DOCUMENTS 9,605,578 B1 * 3/2017 Qi ........................... F01N 9/002
9,803,524 B2 * 10/2017 Kubinski ................ F01N 3/027
(Continued)

FOREIGN PATENT DOCUMENTS

JP      8-296427      11/1996
JP      2011-080942   4/2011
(Continued)

*Primary Examiner* — Binh Q Tran
(74) *Attorney, Agent, or Firm* — Nixon & Vanderhye P.C.

(57) ABSTRACT

A particulate matter detecting device includes: an element unit on which particulate matter contained in exhaust gas from an internal combustion engine is deposited; a heater that heats the element unit; a detecting unit that detects the amount of particulate matter on the basis of electrical characteristics of the element unit; and a control unit that controls the operation of the heater. For a predetermined period that does not include a period in which the particulate matter is deposited on the element unit, the control unit operates the heater using a predetermined amount of control set in advance such that the temperature of the element unit is higher than the temperature of the exhaust gas and lower than a predetermined temperature at which the element unit is thermally degraded.

15 Claims, 2 Drawing Sheets

(51) Int. Cl.
  *G01N 15/06* (2006.01)
  *F01N 3/00* (2006.01)
  *F02D 41/14* (2006.01)
(52) U.S. Cl.
  CPC ............ *G01N 15/06* (2013.01); *G01N 27/04* (2013.01); *F01N 2560/05* (2013.01); *F01N 2560/20* (2013.01); *Y02T 10/47* (2013.01)

(56) References Cited

U.S. PATENT DOCUMENTS

| | | | |
|---|---|---|---|
| 9,846,110 B2 * | 12/2017 | Tylutki | G01N 15/0656 |
| 9,964,481 B2 * | 5/2018 | Zhang | G01M 15/102 |
| 2008/0265870 A1 * | 10/2008 | Nair | G01N 15/0656 324/105 |
| 2012/0144813 A1 | 6/2012 | Yahata et al. | |
| 2012/0233987 A1 | 9/2012 | Aoki et al. | |
| 2012/0324982 A1 * | 12/2012 | Hocken | F01N 11/00 73/28.01 |
| 2014/0165979 A1 | 6/2014 | Nishijima et al. | |

FOREIGN PATENT DOCUMENTS

| | | |
|---|---|---|
| JP | 2012-189049 | 10/2012 |
| JP | 2013-253794 | 12/2013 |
| JP | 2016-037899 | 3/2016 |
| WO | 2016/063491 | 4/2016 |

* cited by examiner

PARTICULATE MATTER DETECTING DEVICE

This application is the U.S. national phase of International Application No. PCT/JP2016/081241 filed Oct. 21, 2016 which designated the U.S. and claims priority to Japanese Patent Application No. 2015-207174 filed Oct. 21, 2015, the entire contents of each of which are hereby incorporated by reference.

TECHNICAL FIELD

The present invention relates to a device that detects particulate matter contained in exhaust gas from an internal combustion engine.

BACKGROUND ART

A conventional particulate matter sensor detects particulate matter (hereinafter referred to as "PM") in exhaust gas and thereafter burns the PM accumulated on an element unit of the particulate matter sensor to remove the PM (refer to PTL 1). At this time, the temperature of the element unit of the particulate matter sensor is controlled to be in a predetermined temperature range for burning PM. The particulate matter sensor described in PTL 1 maintains the temperature of the element unit in the predetermined temperature range until the internal combustion engine is stopped after PM is burned and removed. Therefore, the accumulation of PM on the element unit can be reduced after PM is burned and removed. Thus, the next time the internal combustion engine is activated, the particulate matter sensor can start to detect PM without burning PM.

CITATION LIST

Patent Literature

[PTL 1] WO 2012/124054 A

SUMMARY OF THE INVENTION

Technical Problem

However, the particulate matter sensor described in PTL 1 maintains the temperature in the predetermined temperature range for burning PM after PM is detected. Therefore, the thermal stress placed on the element unit of the particulate matter sensor may increase and the durability of the particulate matter sensor may be lowered.

There is also the problem of the accumulation of poisoning matter on the element unit, causing a deterioration in the function of the particulate matter sensor.

The present invention has been made in consideration of these circumstances, and the main object thereof is to provide a particulate matter detecting device capable of reducing both the thermal stress placed on an element unit of the particulate matter detecting device and the accumulation of poisoning matter on the element unit.

Solution to Problem

Hereinafter, means of solving the above-described problems and the effects thereof will be described.

The present invention is a particulate matter detecting device including an element unit, a heater, a detecting unit, and a control unit. Particulate matter contained in exhaust gas from an internal combustion engine is deposited on the element unit. The heater heats the element unit. The detecting unit detects the amount of particulate matter based on electrical characteristics of the element unit. The control unit controls the operation of the heater. The control unit is characterized by operating the heater for a predetermined period using a predetermined amount of control set in advance. The predetermined period does not include a period in which the particulate matter is deposited on the element unit. The predetermined amount of control is set in advance such that the temperature of the element unit is higher than the temperature of the exhaust gas and lower than a predetermined temperature at which the element unit is thermally degraded.

According to the above configuration, particulate matter (PM) contained in exhaust gas from the internal combustion engine is deposited on the element unit. Since PM has some degree of conductivity, the deposition of PM on the element unit causes a change in the electrical characteristics of the element unit. Therefore, the amount of particulate matter is detected by the detecting unit based on the electrical characteristics of the element unit.

Then, the heater that heats the element unit is activated by the control unit for the predetermined period using the predetermined amount of control set in advance. Since the heater is activated for the predetermined period that does not include the period in which particulate matter is deposited on the element unit, the activation of the heater does not interfere with the deposition of particulate matter on the element unit.

Note that the predetermined amount of control is set in advance such that the temperature of the element unit is lower than the predetermined temperature at which the element unit is thermally degraded. Therefore, even when the heater is activated using the predetermined amount of control, the thermal stress applied on the element unit can be reduced. Furthermore, the predetermined amount of control is set in advance such that the temperature of the element unit is higher than the temperature of exhaust gas. In a case where microparticles exist in a place having a temperature gradient, the particles are subjected to a thermophoretic force in a direction toward the low-temperature side. Therefore, the thermophoretic force can be exerted on poisoning matter and PM in a direction away from the element unit, and the accumulation of poisoning matter on the element unit can be reduced. Moreover, since the heater is activated using the predetermined amount of control set in advance, there is no need to detect the temperature of the element unit to adjust the amount of control.

DESCRIPTION OF EMBODIMENT

Hereinafter, an embodiment will be described with reference to the drawings. The present embodiment is implemented as an internal combustion engine system mounted in a vehicle.

<Device Configuration According to Embodiment>

Figure 1:
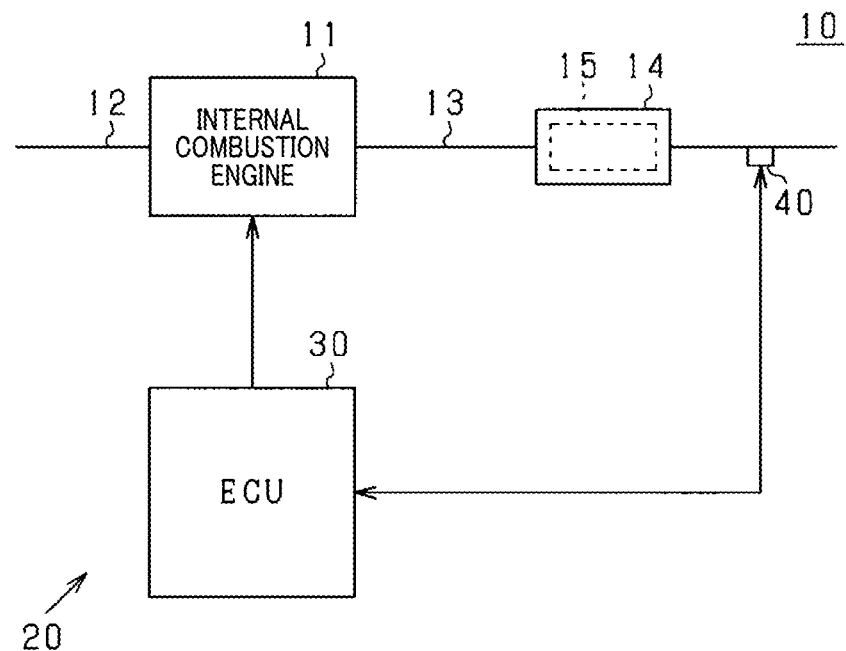
FIG. 1 is a schematic diagram illustrating an outline of an internal combustion engine system.

Referring to FIG. 1, an internal combustion engine system 10 is provided with an internal combustion engine 11 that is a diesel engine. An intake passage 12 and an exhaust passage 13 are connected to the internal combustion engine 11. An exhaust purifier 14 is installed in the exhaust passage 13. The exhaust purifier 14 is configured to remove harmful components (e.g., nitrogen oxides, compounds of carbon, such as HC and CO generated from unburned fuel or through incomplete combustion of fuel, and PM) from exhaust gas emitted from the internal combustion engine 11. In particular, in the present embodiment, the exhaust purifier 14 is provided with a PM collecting filter 15 (corresponding to a filter). Since the configuration of the exhaust purifier 14 is well-known, the description thereof is omitted herein.

The internal combustion engine system 10 is also provided with a PM detecting device 20 as a "particulate matter detecting device". The PM detecting device 20 includes an electric control unit (ECU) 30 and a PM sensor 40. The ECU 30 is configured to control the operation of the internal combustion engine 11 and auxiliaries therefore and to control the operation of the PM detecting device 20.

Figure 2:
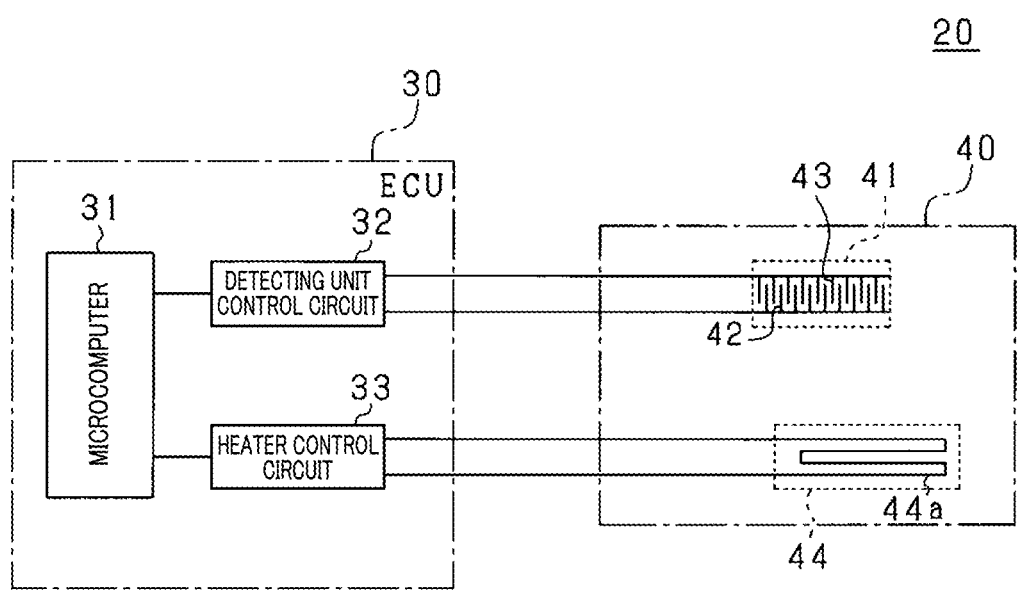
FIG. 2 is a schematic diagram illustrating a circuit configuration of a PM detecting device.

Referring to FIG. 2, the ECU 30 includes a microcomputer 31, a detecting unit control circuit 32, and a heater control circuit 33. The microcomputer 31 includes a central processing unit (CPU), a read only memory (ROM), a random access memory (RAM), a non-volatile memory, and the like, which are not illustrated.

The detecting unit control circuit 32 is connected to an element unit 41 (including a pair of detecting electrodes 42 and 43) provided in the PM sensor 40. The detecting unit control circuit 32 is also connected to the microcomputer 31. The detecting unit control circuit 32 includes a power supply circuit (not illustrated) that outputs a voltage to be applied between the detecting electrodes 42 and 43 and a detecting circuit (not illustrated) that detects the electrical characteristics of the element unit 41. The detecting unit control circuit 32 causes the detecting circuit to detect the electrical characteristics of the element unit 41 that depend on how PM is deposited on the element unit 41 while causing the power circuit to apply a voltage between the detecting electrodes 42 and 43. The detecting circuit is designed to input the detected electrical characteristics to the microcomputer 31. Possible examples of electrical characteristics include the current flowing between the detecting electrodes 42 and 43, the resistance between the detecting electrodes 42 and 43, and the like. On the basis of the detected electrical characteristics, the microcomputer 31 calculates the amount of PM deposited on the element unit 41 to eventually calculate the amount of PM contained in exhaust gas from the internal combustion engine 11. Note that the detecting unit control circuit 32 and the microcomputer 31 constitute a detecting unit.

The heater control circuit 33 is connected to a heater 44 (including an electric heating wire 44a) provided in the PM sensor 40. The heater control circuit 33 is also connected to the microcomputer 31. The heater control circuit 33 includes a power circuit (not illustrated) and a drive circuit (not illustrated). The power circuit outputs a voltage for application to the electric heating wire 44a. The drive circuit changes how the voltage of the power circuit is output to the electric heating wire 44a. The drive circuit changes a duty cycle, i.e., the ratio of the duration of energizing the electric heating wire 44a to a predetermined cycle (pulse width modulation control). The microcomputer 31 controls the operation of the heater 44 by commanding the drive circuit to use a certain duty cycle. Note that the heater control circuit 33 and the microcomputer 31 constitute a control unit.

Figure 3:
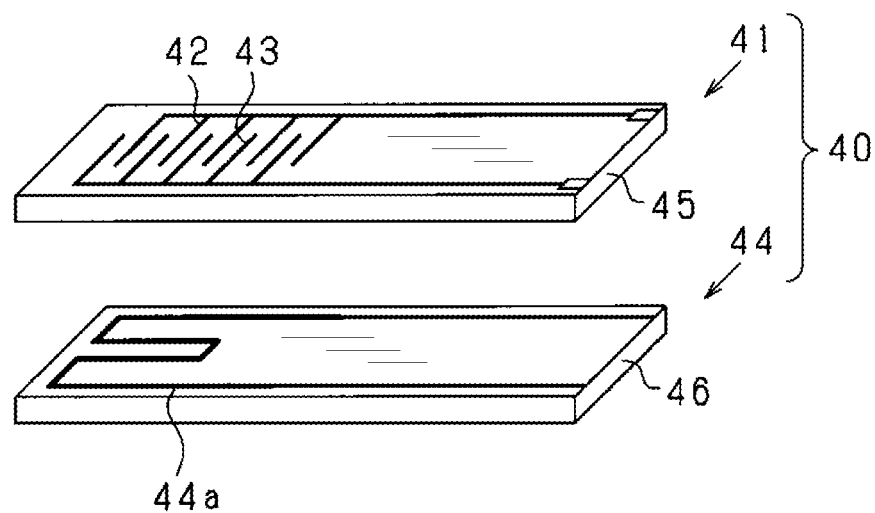
FIG. 3 is an exploded perspective view illustrating an element unit and a heater of a PM sensor.

Referring to FIGS. 2 and 3, a detailed configuration of the PM sensor 40 will be described. The PM sensor 40 includes the element unit 41 and the heater 44 as described above.

The element unit 41 is installed in the exhaust passage 13 so as to be exposed to exhaust gas to deposit PM contained in the exhaust gas on itself. The element unit 41 includes an insulating substrate 45 and the pair of detecting electrodes 42 and 43. The detecting electrodes 42 and 43 are made of platinum, for example, and formed on the insulating substrate 45. It is known that platinum is oxidized and reduced by evaporation under a high-temperature oxygen atmosphere despite its high resistance to heat. Samples of the detecting electrodes 42 and 43 made of platinum were subjected to a high-temperature load test in atmospheric air for 720 hours. As a result, the electrodes were reduced by evaporation at temperatures of 650° C. (corresponding to a predetermined temperature) and higher, and were not reduced by evaporation at a temperature of 600° C. The insulating substrate 45 is made of a ceramic material or the like.

The heater 44 is provided such that it is energized to generate heat for heating the element unit 41, thereby burning and removing the PM deposited on the element unit 41. The heater 44 includes an insulating substrate 46 and the electric heating wire 44a. The electric heating wire 44a is made of platinum, for example, and formed on the insulating substrate 46. The insulating substrate 46 is made of a ceramic material or the like.

The PM sensor 40 is formed by placing (bonding) one of the insulating substrates 45 and 46 on (to) the other in such a manner that the element unit 41 and the heater 44 do not face each other. The element unit 41 is formed on the insulating substrate 45. The heater 44 is formed on the insulating substrate 46. Note that since the configuration of the PM sensor 40 is well-known, further description thereof is omitted herein.

If poisoning matter is accumulated on the element unit 41, the function of the PM sensor 40 is deteriorated. Examples of poisoning matter include iron oxides in the exhaust passage 13 and ash residues that remain after the PM on the element unit 41 is burned (hereinafter referred to as "ash"). The main component of ash is a metal salt (insulating material), such as calcium sulfate and magnesium sulfate. This type of component is derived from a metal element, such as calcium, contained in the lubricant for the internal combustion engine 11, sulfur contained in fuel, or the like. An increase in the amount of accumulated poisoning matter leads to a rise in the electrical resistance of the element unit 41 and to difficulty in depositing PM on the element unit 41.

In this regard, in the present embodiment, the ECU 30 causes the heater 44 to heat the element unit 41 for a predetermined period that does not include a collecting period in which PM is deposited on the element unit 41. The purpose of this heating is to exert a thermophoretic force for moving poisoning matter and PM away from the element unit 41. Thermophoresis is a phenomenon in which microparticles move toward the low-temperature side in a place having a temperature gradient. Specifically, if the temperature of the element unit 41 is higher than the temperature of exhaust gas, the thermophoretic force is exerted on poisoning matter and PM in a direction away from the element unit 41. However, if the temperature of the element unit 41 is too high, the detecting electrodes 42 and 43 of the element unit 41 may be oxidized and evaporated as described above.

In order to address this problem, the ECU 30 operates the heater 44 for the predetermined period that does not include the collecting period in which PM is deposited on the element unit 41. At this time, a predetermined amount of control is set in advance such that the temperature of the element unit 41 is higher than the temperature of exhaust gas and lower than a predetermined temperature (650° C.) at which the element unit 41 is thermally degraded. Specifically, the microcomputer 31 commands the drive circuit of the heater control circuit 33 to change the duty cycle D to a preset duty cycle D2 (predetermined duty cycle). The drive circuit of the heater control circuit 33 energizes the electric heating wire 44a of the heater 44 using the duty cycle D2. The duty cycle D2 is determined as appropriate according to each vehicle equipped with the internal combustion engine 11.

A possible lower limit of the duty cycle D2 is determined such that the temperature of the element unit 41 is higher than the temperature of exhaust gas even in the operation state of the internal combustion engine 11 that is most likely to reduce the temperature of the element unit 41. The operation state of the internal combustion engine 11 that is most likely to reduce the temperature of the element unit 41 can be an operation state in which low-temperature exhaust gas flows at a high flow rate.

A possible upper limit of the duty cycle D2 is determined such that the temperature of the detecting electrodes 42 and 43 of the element unit 41 is lower than 650° C. (predetermined temperature) at which thermal degradation is caused even in the operation state of the internal combustion engine 11 that is most likely to increase the temperature of the element unit 41. The operation state of the internal combustion engine 11 that is most likely to increase the temperature of the element unit 41 can be an operation state in which high-temperature exhaust gas flows at a high flow rate. The duty cycle D2 is set as a fixed value between the lower and upper limits. In a case where the heater 44 is operated using the preset duty cycle D2, the temperature of the element unit 41 varies according to the temperature of exhaust gas. Note that the duty cycle D2 is set in advance such that the difference between the temperature of the element unit 41 and the temperature of exhaust gas is smaller than 100° C.

If the temperature of exhaust gas temporarily rapidly increases or if the element unit 41 is rapidly cooled, the temperature of the element unit 41 may temporarily fall below the temperature of exhaust gas. In this case, the thermophoretic force can no longer be exerted on poisoning matter and PM in a direction away from the element unit 41. However, such a situation cannot be completely prevented without setting the duty cycle D2 at an excessively high level, and the temperature of the element unit 41 is highly likely to exceed 650° C. by doing so. In order to address this problem, the duty cycle D2 is set in advance such that the temperature of the element unit 41 is higher than the temperature of exhaust gas for more than 80% of the predetermined period. The predetermined period is a period in which the heater 44 is operated using the duty cycle D2. The internal combustion engine 11 was operated steadily in the maximum rotational speed range. The test was conducted by stopping the heater 44 to provide a period in which the temperature of exhaust gas exceeded the temperature of the element unit 41 under the condition corresponding to a situation where the vehicle actually ran 300,000 km. As a result, the sensitivity of the PM sensor 40 was not deteriorated if the temperature of exhaust gas was lower than the temperature of the element unit 41 for 80% or more of the predetermined period, and the PM sensor 40 was deteriorated by 15%, 21%, and 30% if the temperature of exhaust gas was lower than the temperature of the element unit 41 for 75%, 70%, and 65% of the predetermined period, respectively.

Furthermore, the PM collecting filter 15 is provided upstream of the element unit 41 in the exhaust passage 13 of the internal combustion engine 11. During a period in which the PM collected by the PM collecting filter 15 is burned, high-temperature exhaust gas is likely to flow to the element unit 41 to cause a rapid rise in the temperature of the element unit 41. Similarly, during a period of rapid acceleration of the internal combustion engine 11, high-temperature exhaust gas is likely to flow to the element unit 41 to cause a rapid rise in the temperature of the element unit 41. In these cases, the temperature of the element unit 41 cannot exceed the temperature of exhaust gas without setting the duty cycle D2 at an excessively high level as in the case above, and the temperature of the element unit 41 is highly likely to exceed 650° C. by doing so. In order to address this problem, the duty cycle D2 is set in advance such that the temperature of exhaust gas is allowed to exceed the temperature of the element unit 41 for the period in which the PM collected by the PM collecting filter 15 is burned or for the period of rapid acceleration of the internal combustion engine 11.

As described above, in the present embodiment, the duty cycle D2 is set in advance such that the temperature of exhaust gas is lower than the temperature of the element unit 41 for more than 80% of the period (predetermined period) in which the heater 44 is operated using the duty cycle D2. In other words, the duty cycle D2 is set in advance such that the temperature of exhaust gas is higher than the temperature of the element unit 41 for less than 20% of the predetermined period. At this time, the temperature of the element unit 41 does not rise to a temperature higher than the temperature of exhaust gas by 100° C. or more but rises only up to 600° C.

In the present embodiment, the amount of PM is detected by the PM detecting device 20 once during the period from the beginning to the end of the operation of the internal combustion engine 11. Therefore, the predetermined period in which the element unit 41 is heated by the heater 44 using the duty cycle D2 is included in the period that begins after the amount of PM is detected. Specifically, the period from the time when the detection of the amount of PM is completed to the time when the operation of the internal combustion engine 11 is stopped is set as the predetermined period.

Figure 4:
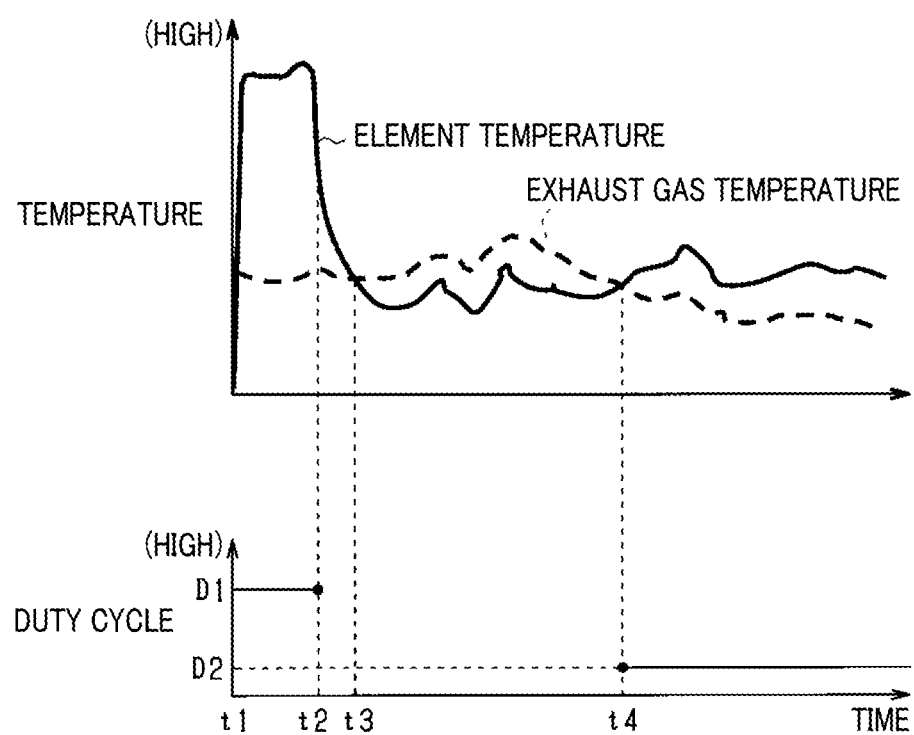
FIG. 4 is a time chart illustrating changes in element temperature and exhaust gas temperature.

FIG. 4 is a time chart illustrating how the temperature of the element unit 41 and the temperature of exhaust gas change during the process of detecting the amount of PM by the PM detecting device 20.

At time t1, the ECU 30 starts the control for burning the PM deposited on the element unit 41 prior to detecting the amount of PM. Specifically, the microcomputer 31 commands the drive circuit of the heater control circuit 33 to change the duty cycle D to a preset duty cycle D1 higher than the duty cycle D2. The drive circuit of the heater control circuit 33 energizes the electric heating wire 44a of the heater 44 using the duty cycle D1. The duty cycle D1 is a duty cycle that raises the temperature of the element unit 41 to a temperature (for example, 600° C.) at which PM can be burned, and is determined as appropriate according to each vehicle equipped with the internal combustion engine 11. Consequently, the temperature of the element unit 41 rises to approximately 600° C. as indicated by the solid line. The temperature of exhaust gas fluctuates according to the operation state of the internal combustion engine 11 as indicated by the broken line. Therefore, the temperature of the element unit 41 fluctuates around 600° C. according to the temperature of exhaust gas. The period between times t1 and t2 is a burning period in which the PM deposited on the element unit 41 is burned (PM sensor reconditioning mode).

At time t2, the ECU 30 completes the control for burning the PM deposited on the element unit 41. Specifically, the microcomputer 31 commands the drive circuit of the heater control circuit 33 to change the duty cycle D to 0%. Consequently, the temperature of the element unit 41 decreases. The period between times t2 and t3 is a cooling period in which the element unit 41 is cooled (PM sensor cooling mode).

At time t3, the ECU 30 starts the control for depositing PM on the element unit 41. At this time, the detecting unit control circuit 32 may allow the power circuit to apply a voltage between the detecting electrodes 42 and 43, thereby charging the PM passing near the detecting electrodes 42 and 43 (electrostatic collection). The charged PM is easily deposited on the element unit 41. The temperature of exhaust gas fluctuates according to the operation state of the internal combustion engine 11, and the temperature of the element unit 41 also fluctuates accordingly around temperatures slightly lower than the temperature of exhaust gas. The period between times t3 and t4 is a collecting period in which PM is deposited on the element unit 41 (PM collecting mode).

At time t4, the ECU 30 detects the amount of PM deposited on the element unit 41. Specifically, the detecting unit control circuit 32 causes the detecting circuit to detect the value of current flowing between the detecting electrodes 42 and 43 while causing the power circuit to apply a voltage between the detecting electrodes 42 and 43. The detecting circuit inputs the detected current value to the microcomputer 31. The microcomputer 31 calculates the amount of PM deposited on the element unit 41 on the basis of the input current value. For example, the microcomputer 31 includes a map that defines the relation between the current value and the amount of PM during the PM collecting period (times t3 to t4). The map can be set in advance on the basis of experiments or the like. The microcomputer 31 then refers to the map to calculate the amount of PM corresponding to the input current value and to eventually calculate the amount of PM contained in exhaust gas from the internal combustion engine 11.

After time t4, the ECU 30 executes the control for reducing the deposition of poisoning matter and PM on the element unit 41. Specifically, the microcomputer 31 commands the drive circuit of the heater control circuit 33 to change the duty cycle D to the duty cycle D2. The drive circuit of the heater control circuit 33 energizes the electric heating wire 44a of the heater 44 using the duty cycle D2. Consequently, the temperature of the element unit 41 indicated by the solid line is maintained at temperatures slightly higher than the temperature of exhaust gas indicated by the broken line. The temperature of exhaust gas fluctuates according to the operation state of the internal combustion engine 11. Therefore, the temperature of the element unit 41 fluctuates around temperatures slightly higher than the temperature of exhaust gas according to the temperature of exhaust gas. The period that begins after time t4 is a reducing period in which the deposition of poisoning matter and PM on the element unit 41 is reduced (deposition reducing mode).

The present embodiment described in detail above has the following advantages.

For the predetermined period excluding the collecting period (times t3 to t4) in which PM is deposited on the element unit 41, the heater 44 is operated by the microcomputer 31 and the heater control circuit 33 (ECU 30) using the preset duty cycle D2 (predetermined amount of control). Since the heater 44 is operated for the predetermined period excluding the collecting period in which PM is deposited on the element unit 41, the operation of the heater 44 does not interfere with the deposition of PM on the element unit 41.

The duty cycle D2 is set in advance such that the temperature of the element unit 41 is lower than 650° C. (predetermined temperature) at which the element unit 41 is thermally degraded. Therefore, even when the heater 44 is operated using the duty cycle D2, the thermal stress applied on the element unit 41 can be reduced. Furthermore, the duty cycle D2 is set in advance such that the temperature of the element unit 41 is higher than the temperature of exhaust gas for 10% of the predetermined period. In a case where microparticles exist in a place having a temperature gradient, the particles are subjected to a thermophoretic force in a direction toward the low-temperature side. Therefore, the thermophoretic force can be exerted on poisoning matter (e.g., ash, iron oxides, and the like) and PM in a direction away from the element unit 41, and the accumulation of poisoning matter on the element unit 41 can be reduced. Moreover, since the heater 44 is operated using the preset duty cycle D2, there is no need to detect the temperature of the element unit 41 to adjust the amount of control.

The duty cycle D2 is set in advance such that the difference between the temperature of the element unit 41 and the temperature of exhaust gas is smaller than 100° C. Generally, the temperature of exhaust gas from a diesel engine rises up to 500° C. Therefore, the temperature of the element unit 41 can be prevented from exceeding 600° C. even when the temperature of exhaust gas fluctuates.

The duty cycle D2 is set in advance such that the temperature of the element unit 41 is higher than the temperature of exhaust gas for more than 80% of the predetermined period. The predetermined period is defined as a period in which the heater 44 is operated using the duty cycle D2. Therefore, the thermal stress applied on the element unit 41 and the accumulation of poisoning matter on the element unit 41 can be reduced in a well-balanced manner.

The duty cycle D2 is set in advance such that the temperature of exhaust gas is allowed to exceed the temperature of the element unit 41 for the period in which the PM collected by the PM collecting filter 15 is burned or for the period of rapid acceleration of the internal combustion engine 11. In such a case, therefore, the temperature of the element unit 41 can be exceptionally permitted to temporarily fall below the temperature of exhaust gas. In addition, the duty cycle D2 can be prevented from being set at an excessively high level.

The predetermined period in which the heater 44 is operated using the duty cycle D2 is included in the period that begins after the amount of PM is detected by the microcomputer 31 and the detecting unit control circuit 32 (ECU 30). Therefore, the operation of the heater 44 can be prevented from interfering with the deposition of PM on the element unit 41 until the amount of PM is detected. Furthermore, after the amount of PM is detected, the accumulation of poisoning matter on the element unit 41 can be reduced. In particular, since the period from the time when the detection of the amount of PM is completed to the time when the operation of the internal combustion engine 11 is stopped is set as the predetermined period, the amount of poisoning matter deposited on the element unit 41 can be minimized.

By operating the heater 44 using the duty cycle D2, the temperature of the element unit 41 exceeds the temperature of exhaust gas. At this time, since the temperature of the element unit 41 fluctuates according to the temperature of exhaust gas, the temperature of the element unit 41 can be reduced when the temperature of exhaust gas is low. Therefore, the element unit 41 can be prevented from being heated more than necessary in this configuration, as compared with a configuration in which the temperature of the element unit 41 is maintained at a certain temperature higher than the temperature of exhaust gas. Thus, the thermal stress applied on the element unit 41 can be reduced.

Note that the above embodiment can be changed in the following manner in practice.

In a case where the amount of PM is detected multiple times during the period from the beginning to the end of the operation of the internal combustion engine 11, the predetermined period in which the heater 44 is operated using the duty cycle D2 may be included in the period that begins each time the amount of PM is detected.

Prior to the burning period (times t1 to t2) in which the PM deposited on the element unit 41 is burned, a water repellent period in which the water deposited on the element unit 41 is repelled through the Leidenfrost phenomenon may be provided (water repellent mode). In this case, the heater 44 may be energized using the duty cycle D2 during the water repellent period (predetermined period). Consequently, the deposition of poisoning matter on the element unit 41 can be reduced during the water repellent period.

During the collecting period (times t3 to t4) in which PM is deposited on the element unit 41, it is desirable that no PM be deposited on the element unit 41 for a period in which the deposition of PM on the element unit 41 causes a malfunction. Therefore, a period of operation of the internal combustion engine 11 in which the deposition of PM on the element unit 41 causes a malfunction may be set as the predetermined period excluding the collecting period in which PM is deposited on the element unit 41. Then, after the period in which the deposition of PM causes a malfunction is completed, the PM collecting period is restarted, and PM is deposited on the element unit 41 until the collecting period that does not include the predetermined period reaches a reference period. Such a configuration enables the heater 44 to be operated for the predetermined period using the duty cycle D2. Therefore, the thermophoretic force can be exerted on PM as well as on poisoning matter in a direction away from the element unit 41, and the accumulation of PM on the element unit 41 can be reduced. As a result, PM can be deposited on the element unit 41 for an appropriate period, and the accuracy of detecting the amount of PM can be improved. Note that possible examples of periods in which the deposition of PM on the element unit 41 causes a malfunction include the period of starting the internal combustion engine 11, the period of accelerating or decelerating the internal combustion engine 11, and the like.

According to the above configuration, if the temperature of exhaust gas temporarily soars, the temperature of the element unit 41 may temporarily exceed a temperature (for example, 500° C.) at which PM starts to burn. In this case, the PM deposited on the element unit 41 is liable to temporarily burn. However, such a situation cannot be completely prevented without setting the duty cycle D2 at an excessively low level, and the temperature of the element unit 41 is highly likely to fall below the temperature of exhaust gas by doing so.

In order to address this problem, the duty cycle D2 may be set in advance such that the temperature of the element unit 41 is lower than the temperature at which PM starts to burn for more than 80% of the predetermined period. The predetermined period is defined as a period in which the heater 44 is operated using the duty cycle D2. According to such a configuration, the PM deposited on the element unit 41 can be prevented from burning before being detected, and abnormal accumulation of PM on the element unit 41 can be reduced. Note that even when the temperature of the element unit 41 temporarily exceeds the temperature at which PM starts to burn, PM does not immediately burn and disappear.

In the above configuration, the duty cycle D2 may be set in advance such that the temperature of the element unit 41 is allowed to exceed the temperature at which PM starts to burn for the period in which the PM collected by the PM collecting filter 15 is burned or for the period of rapid acceleration of the internal combustion engine 11. According to such a configuration, in the above case, the temperature of the element unit 41 can be exceptionally permitted to temporarily exceed the temperature at which PM starts to burn, and the duty cycle D2 can be prevented from being set at an excessively low level.

The element unit 41 can be rapidly cooled, for example, at extremely low temperatures in cold climates or the like.

The duty cycle D2 is not necessarily a fixed value but may be varied between the lower and upper limits.

The configuration of operating the heater 44 using the predetermined amount of control set in advance is not limited to the configuration of energizing the heater 44 using the duty cycle D2. The configuration of energizing the heater 44 using a predetermined current value set in advance or the configuration of energizing the heater 44 using a predetermined voltage value set in advance may be employed. In short, the heater 44 only needs to be operated using the predetermined amount of control set in advance such that the temperature of the element unit 41 is higher than the temperature of exhaust gas and lower than the predetermined temperature at which the element unit 41 is thermally degraded.

In a case where the temperature of the element unit 41 is higher than the temperature at which PM starts to burn, the ECU 30 may operate the heater 44 using an amount of control that reduces the temperature of the element unit 41 instead of operating the heater 44 using the predetermined amount of control. The temperature of the element unit 41 may be estimated, for example, on the basis of the operation state of the internal combustion engine 11. For example, the amount of control reduced by a certain amount from the predetermined amount of control can be employed as the amount of control that reduces the temperature of the element unit 41. According to such a configuration, the PM deposited on the element unit 41 can be prevented from temporarily burning.

Furthermore, a temperature sensor that detects the temperature of the element unit 41 is provided in the internal combustion engine. If the temperature detected by the temperature sensor is higher than the temperature at which PM starts to burn, the ECU 30 can employ the following configuration. Specifically, the ECU 30 may operate the heater 44 using an amount of control that reduces the temperature of the element unit 41 instead of operating the heater 44 using the predetermined amount of control. According to such a configuration, the PM deposited on the element unit 41 can be reliably prevented from temporarily burning. A thermistor or the like that detects the temperature of the element unit 41 can be employed as the temperature sensor. Once the electric heating wire 44a of the heater 44 is energized to generate heat, the resistance value of the electric heating wire 44a varies. There is a certain relation between the temperature of the electric heating wire 44a and the resistance value of the electric heating wire 44a, and the temperature of the element unit 41 can be detected on the basis of the resistance value of the electric heating wire 44a. In this case, the electric heating wire 44a corresponds to the temperature sensor. Note that in a case where the temperature sensor that detects the temperature of the element unit 41 is provided, the predetermined amount of control can be adjusted such that the temperature of the element unit 41 reaches a target temperature.

The heater 44 may be provided separately from the PM sensor 40.

The PM detecting device (particulate matter detecting device) may include a PM sensor module including the PM sensor 40 and a control unit for the PM sensor 40.

The present embodiment can also be implemented as a device that detects PM contained in exhaust gas from an internal combustion engine that uses fuel such as gasoline, alcohol, and natural gas. However, the temperature of exhaust gas from a gasoline engine generally rises up to 800° C. Therefore, the element unit 41 needs to be attached at a position where the temperature of exhaust gas flowing to the element unit 41 rises only up to 500° C. Note that the temperature of exhaust gas flowing into the element unit 41 may be permitted to temporarily exceed 500° C. in a limited operation state of the gasoline engine (internal combustion engine).

REFERENCE SIGNS LIST

11 . . . internal combustion engine, 20 . . . PM detecting device, 30 . . . ECU, 31 . . . microcomputer, 32 . . . detecting unit control circuit, 33 . . . heater control circuit, 40 . . . PM sensor, 41 . . . element unit, 44 . . . heater

The invention claimed is:

1. A particulate matter detecting device comprising:
an element unit on which particulate matter contained in exhaust gas from an internal combustion engine is deposited;
a heater that heats the element unit;
a detecting unit that detects an amount of the particulate matter on the basis of electrical characteristics of the element unit; and
a control unit that controls operation of the heater, wherein
for a predetermined period excluding a period in which the particulate matter is deposited on the element unit, the control unit operates the heater using a predetermined amount of control set in advance such that a temperature of the element unit is higher than a temperature of the exhaust gas and lower than 650° C. to exert a thermophoretic force for moving the particulate matter away from the element unit; and
the predetermined period is a period prior to a period in which the particulate matter deposited on the element unit is burned.

2. The particulate matter detecting device according to claim 1, wherein
the temperature of the element unit varies according to the temperature of the exhaust gas.

3. A particulate matter detecting device comprising:
an element unit on which particulate matter contained in exhaust gas from an internal combustion engine is deposited;
a heater that heats the element unit;
a detecting unit that detects an amount of the particulate matter on the basis of electrical characteristics of the element unit; and
a control unit that controls operation of the heater, wherein
for a predetermined period excluding a period in which the particulate matter is deposited on the element unit, the control unit operates the heater using a predetermined amount of control set in advance such that a temperature of the element unit is higher than a temperature of the exhaust gas and lower than 650° C. to exert a thermophoretic force for moving the particulate matter away from the element unit; and
the temperature of the element unit varies according to the temperature of the exhaust gas.

4. The particulate matter detecting device according to claim 1, wherein
if the temperature of the element unit is higher than the temperature at which the particulate matter starts to burn, the control unit operates the heater using an amount of control that reduces the temperature of the element unit instead of operating the heater using the predetermined amount of control.

5. A particulate matter detecting device comprising:
an element unit on which particulate matter contained in exhaust gas from an internal combustion engine is deposited;
a heater that heats the element unit;
a detecting unit that detects an amount of the particulate matter on the basis of electrical characteristics of the element unit; and
a control unit that controls operation of the heater, wherein
for a predetermined period excluding a period in which the particulate matter is deposited on the element unit, the control unit operates the heater using a predetermined amount of control set in advance such that a temperature of the element unit is higher than a temperature of the exhaust gas and lower than 650° C. to exert a thermophoretic force for moving the particulate matter away from the element unit; and
if the temperature of the element unit is higher than the temperature at which the particulate matter starts to burn, the control unit operates the heater using an amount of control that reduces the temperature of the element unit instead of operating the heater using the predetermined amount of control.

6. The particulate matter detecting device according to claim 1, comprising
a temperature sensor that detects the temperature of the element unit, wherein
if the temperature detected by the temperature sensor is higher than the temperature at which the particulate matter starts to burn, the control unit operates the heater using the amount of control that reduces the temperature of the element unit instead of operating the heater using the predetermined amount of control.

7. A particulate matter detecting device comprising:
an element unit on which particulate matter contained in exhaust gas from an internal combustion engine is deposited;

a heater that heats the element unit;

a detecting unit that detects an amount of the particulate matter on the basis of electrical characteristics of the element unit; and a control unit that controls operation of the heater, wherein for a predetermined period excluding a period in which the particulate matter is deposited on the element unit, the control unit operates the heater using a predetermined amount of control set in advance such that a temperature of the element unit is higher than a temperature of the exhaust gas and lower than 650° C. to exert a thermophoretic force for moving the particulate matter away from the element unit;

the particulate matter detecting device further comprises a temperature sensor configured to detect a temperature of the element unit; and if the temperature detected by the temperature sensor is higher than the temperature at which the particulate matter starts to burn, the control unit operates the heater using the amount of control that reduces the temperature of the element unit instead of operating the heater using the predetermined amount of control.

8. The particulate matter detecting device according to claim 1, wherein the predetermined amount of control is set in advance such that a difference between the temperature of the element unit and the temperature of the exhaust gas is smaller than 100° C.

9. The particulate matter detecting device according to claim 1, wherein the predetermined amount of control is set in advance such that the temperature of the element unit is higher than the temperature of the exhaust gas for more than 80% of the predetermined period.

10. The particulate matter detecting device according to claim 1, wherein a filter that collects and burns the particulate matter is provided upstream of the element unit in an exhaust passage for the internal combustion engine, and the predetermined amount of control is set in advance such that the temperature of the exhaust gas is allowed to exceed the temperature of the element unit for a period in which the particulate matter collected by the filter is burned or for a period of rapid acceleration of the internal combustion engine.

11. The particulate matter detecting device according to claim 3, wherein the predetermined period is included in a period that begins after the amount of the particulate matter is detected by the detecting unit.

12. The particulate matter detecting device according to claim 1, wherein the predetermined period is a period of operation of the internal combustion engine in which deposition of the particulate matter on the element unit causes a malfunction.

13. The particulate matter detecting device according to claim 12, wherein the predetermined amount of control is set in advance such that the temperature of the element unit is lower than a temperature at which the particulate matter starts to burn for more than 80% of the predetermined period.

14. The particulate matter detecting device according to claim 12, wherein a filter that collects and burns the particulate matter is provided upstream of the element unit in an exhaust passage for the internal combustion engine, and the predetermined amount of control is set in advance such that the temperature of the element unit is allowed to exceed a temperature at which the particulate matter starts to burn for a period in which the particulate matter collected by the filter is burned or for a period of rapid acceleration of the internal combustion engine.

15. The particulate matter detecting device according to claim 1, wherein the control unit controls the operation of the heater using a duty cycle that is a ratio of duration of energizing the heater to a predetermined cycle, and operates the heater using a predetermined duty cycle set in advance for the predetermined period that does not include the period in which the particulate matter is deposited on the element unit.

* * * * *